J. SANDY.
EQUALIZING SPRING SUSPENSION FOR VEHICLES.
APPLICATION FILED OCT. 27, 1916.
1,236,767.
Patented Aug. 14, 1917.
2 SHEETS—SHEET 1.
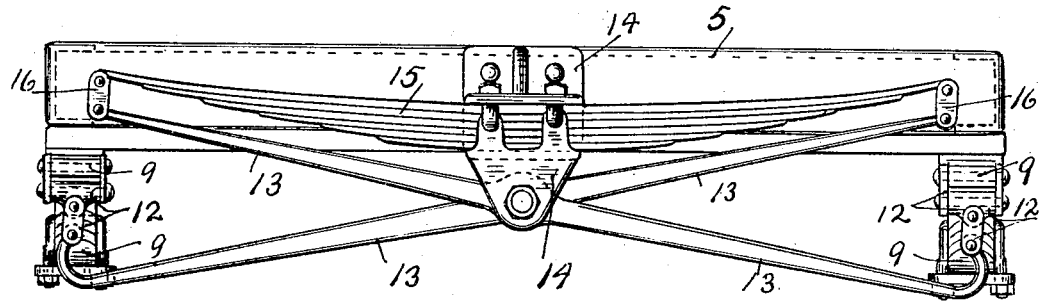
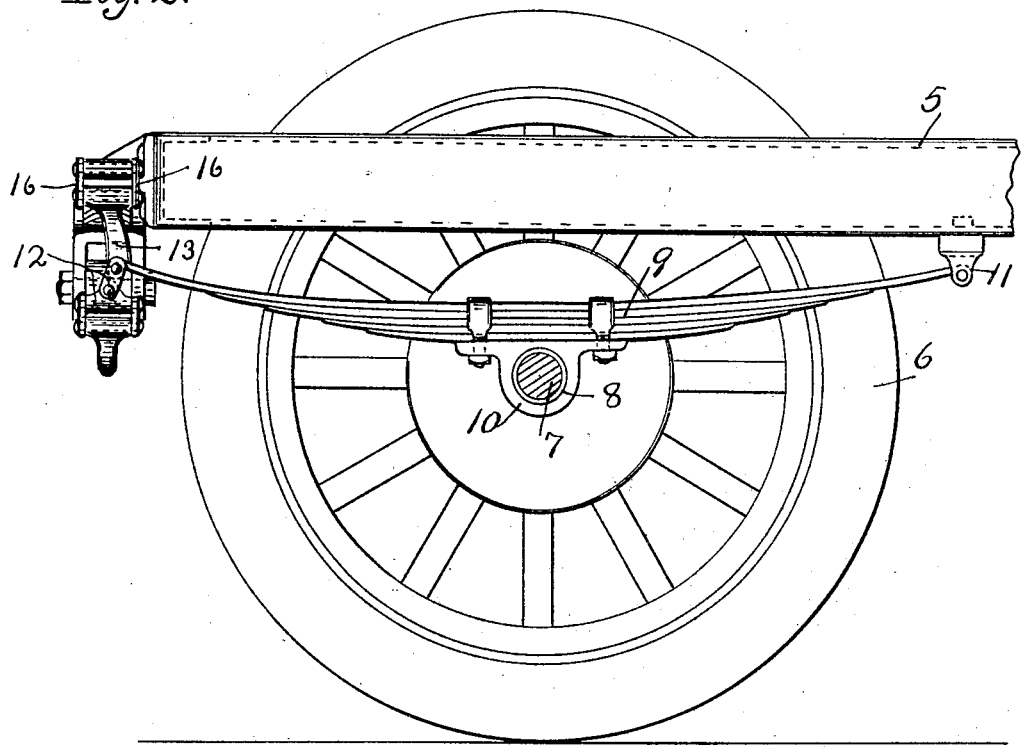
Witnesses
H. L. Opsahl.
E. C. Wells
Inventor
J. SANDY
By his Attorneys

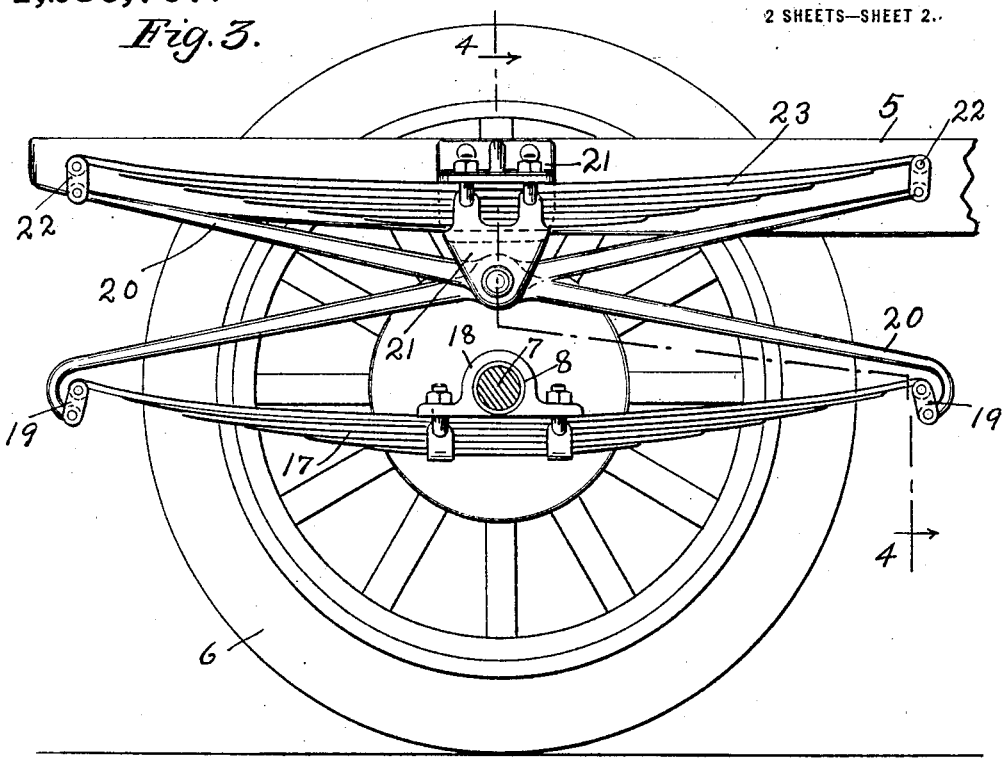
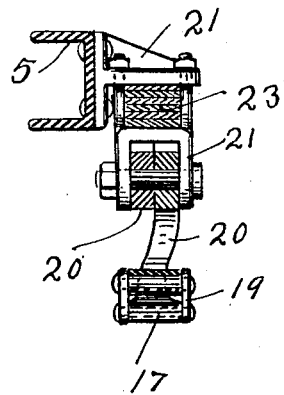

UNITED STATES PATENT OFFICE.

JOSEPH SANDY, OF MINNEAPOLIS, MINNESOTA.

EQUALIZING SPRING SUSPENSION FOR VEHICLES.

1,236,767.  Specification of Letters Patent.  Patented Aug. 14, 1917.

Application filed October 27, 1916. Serial No. 128,112.

*To all whom it may concern:*

Be it known that I, JOSEPH SANDY, a citizen of the United States, residing at Minneapolis, in the county of Hennepin and State of Minnesota, have invented certain new and useful Improvements in Equalizing Spring Suspensions for Vehicles; and I do hereby declare the following to be a full, clear, and exact description of the invention, such as will enable others skilled in the art to which it appertains to make and use the same.

My invention has for its object to provide a simple and highly efficient spring suspension for automobiles and other vehicles in which the shocks incident to rough roads will be equalized in opposing springs, and hence, not transmitted to any considerable extent to the body of the vehicle. Otherwise stated, this spring suspension not only acts in the ordinary way to yieldingly carry the body of the vehicle, but also acts as a shock absorber.

In applying the invention, I employ a pair of transversely crossed levers that are intermediately pivoted to a bearing carried by the vehicle body. The lower ends of these levers are spring-supported from the vehicle body and the weight of the load tends to throw the two levers into parallel relation, but this movement is opposed by a second or so-called equalizing spring which is anchored to the vehicle body and connected to the upper ends of the crossed levers, and exerts a force which tends to hold the said levers in their crossed relation. This second or so-called equalizing spring, therefore, opposes the weight of the load in its tendency to close the levers or to move the same into parallel relation.

Several embodiments of the invention are illustrated in the accompanying drawings wherein like characters indicate like parts throughout the several views.

Referring to the drawings:

Figure 1 is a rear elevation showing the spring suspension applied to the body frame of a vehicle, such as an automobile, the running gear proper not being shown in this view;

Fig. 2 is a side elevation with some parts sectioned and some parts being broken away, showing the manner in which the spring suspension is applied to the frame and rear axle of the running gear of an automobile;

Fig. 3 is a view partly in side elevation and partly in section illustrating the modified manner of applying the spring suspension to an automobile; and Fig. 4 is a section taken on the irregular line 4—4 of Fig. 3.

Of the parts of an automobile or vehicle, the numeral 5 indicates the body frame, the numeral 6 the rear or traction wheels and the numeral 7 the rear axle, and the numeral 8 the rear axle casing.

Referring first to the construction illustrated in Figs. 1 and 2, the numeral 9 indicates semi-elliptical springs located, one on each side of the machine directly under the sides of the frame 5 with their intermediate portions anchored to a bearing 10 that is carried on the rear axle casing 8. The front ends of these springs 9 are pivoted to bearings 11 on the sides of the frame 5.

The rear ends of the springs 9 are connected, as shown, by short links 12, to the lower ends of a pair of crossed equalizing levers 13 that are intermediately pivoted to a bearing 14 that is rigidly anchored to the rear portion of the frame 5. A tranverse semi-elliptical rear spring 15 is also anchored at its intermediate portion to the said bearing 14, and its ends are connected, preferably by short links 16 to the upper ends of crossed equalizing levers 13. The free ends of this spring 15 are under strain to move upward, and hence, the said spring exerts a force which tends to hold the equalizing levers 13 in their crossed relation shown in Fig. 1.

Since the equalizing spring 15 and the bearing 14 for the intermediate pivot of the equalizing levers 13 are both anchored to the body frame 5, the weight of the load tends to throw the said pivot downward, and hence, to close up the levers 13, or in other words, to force the same into parallel relation, but this movement is opposed and prevented by the equalizing spring 15, which latter spring must, of course, have sufficient resistance to carry the load and prevent the said closing movement of the levers.

With this arrangement, when the one or both of the wheels 6 run over an obstruction, and hence, produce a sudden upward movement of the rear axle, such movement or shock is, in part, of course, cushioned by the main springs 9, but the force transmitted through the said springs will impart a closing movement to the crossed equalizing levers 13, that is, will tend to move the same nearer to parallel relation, but this movement will have very little tendency to impart vertical movement to the lever pivot, and hence, to the vehicle body, but will be transmitted through the equalizing levers to the equalizing springs 15, and by pulling downward on the ends of the said equalizing springs, will permit the said levers to close sufficiently to absorb the shock. Thus, the vehicle body is relieved almost entirely from the effect of rough roads. However, under the above action, the front ends of the main springs 9, press upward somewhat on the body frame, but this force is neutralized or equalized substantially by the downward pull transmitted to the said frame through the equalizing levers 13 and equalizing spring 15.

The equalizing levers 13 have another important action, to-wit, their free ends, on both sides, must necessarily partake of equal movement, and hence, tend to keep the vehicle body level and to impart the shock equally to both sides thereof, even when the shock is produced at one wheel only. A spring suspension such as described, may, as is evident, be easily applied to a standard automobile.

In the arrangement illustrated in Figs. 3 and 4, the spring suspensions are independently applied to the opposing sides of the vehicle and the arrangement is as follows:

The semi-elliptical springs 17 are intermediately secured to bearings 18 hung on the axle casing 8, and at their ends, are connected, preferably, by short links 19, to the lower ends of crossed levers 20 that are intermediately pivoted to bearings 21 that are rigidly secured to the sides of the main frame 5, and the upper ends of said levers are connected preferably by links 22 to the front and rear ends of laterally spaced semi-elliptical equalizing springs 23, the intermediate portions of which are rigidly secured to the said bearings 21. In this arrangement, the action in absorbing the shocks is substantially as previously described, except that the equalizing levers 20 do not, in this arrangement, equalize the shock on both sides of the machine, but simply equalize the same between the main spring 17 and equalizing spring 23.

What I claim is:

1. The combination with the running gear and body of a vehicle, of a pair of crossed levers intermediately pivoted to a bearing carried by said body, spring means connecting the lower ends of said levers to said running gear and tending, under the weight of the load, to throw said levers into parallelism, and spring means connected to the body of said vehicle and to the upper ends of said levers and exerting a yielding force opposing the load and tending to hold said levers in their crossed relation.

2. The combination with the running gear and body of a vehicle, of laterally spaced semi-elliptical springs intermediately supported on said running gear and having their front ends connected to said body, a pair of crossed levers intermediately pivoted to a bearing on the rear portion of said body and having their lower ends connected to the rear ends of said laterally spaced springs, and a semi-elliptical spring intermediately anchored to the rear of said body and having its ends connected to the upper ends of said crossed levers and exerting a force in opposition to the load tending to hold said levers in their crossed relation, the weight of the said load acting through said laterally spaced springs tending to move said levers in parallel relation.

In testimony whereof I affix my signature in presence of two witnesses.

JOSEPH SANDY.

Witnesses:
CLARA DEMAREST,
BERNICE G. WHEELER.

Copies of this patent may be obtained for five cents each, by addressing the "Commissioner of Patents, Washington, D. C."